United States Patent [19]
Bodnar et al.

[11] Patent Number: 5,143,945
[45] Date of Patent: Sep. 1, 1992

[54] CARBOXYLIC ACID MODIFIED CARBON DIOXIDE CO-BLOWN POLYURETHANE-POLYISOCYANURATE FOAMS

[75] Inventors: Thomas W. Bodnar, Macungie, Pa.; Leslie A. Cole, New Haven, Conn.; Shenghong A. Dai, Lake Jackson, Tex.

[73] Assignee: The Dow Chemical Company, Midland, Mich.

[21] Appl. No.: 612,723

[22] Filed: Nov. 13, 1990

Related U.S. Application Data

[63] Continuation-in-part of Ser. No. 382,527, Jul. 19, 1989, abandoned.

[51] Int. Cl.$^5$ .............................................. C08G 18/14
[52] U.S. Cl. ................................................... 521/130
[58] Field of Search ............................................ 521/130

[56] References Cited

U.S. PATENT DOCUMENTS 4,417,002 11/1983 Liessem ............................... 521/130
4,758,605 7/1988 Williams ............................. 521/130

*Primary Examiner*—Maurice J. Welsh

[57] ABSTRACT

Disclosed are rigid polyurethane-polyisocyanurate foams prepared from polyisocyanates, polyols, trimer catalysts and a blowing agent mixture comprising (i) a halocarbon, and (ii) an organic carboxylic acid, and, optionally water.

The foams have excellent aged K-factor values at fluorocarbon levels reduced by up to 75 percent over prior art materials.

20 Claims, No Drawings

CARBOXYLIC ACID MODIFIED CARBON DIOXIDE CO-BLOWN POLYURETHANE-POLYISOCYANURATE FOAMS

CROSS-REFERENCE TO RELATED APPLICATION

This application is a continuation-in-part of copending U.S. application Ser. No. 382,527, filed Jul. 19, 1989, now abandoned.

FIELD OF THE INVENTION

This invention relates to the preparation of rigid polyurethane-polyisocyanurate foams and is more particularly concerned with such foams produced with reduced levels of halocarbon blowing agents.

DESCRIPTION OF THE PRIOR ART

The use of organic carboxylic acids, particularly polycarboxylic acids, in the manufacture of various types of rigid polyisocyanate based foams is well documented. In one aspect, the acids are used as major components and form the major recurring units in the preparation of rigid cellular polyamides, polyimides, and rigid foams including other types of recurring linkages besides the amide and/or imide linkages. For example, see such typical patents as U.S. Pat. Nos. 3,300,420: 3,310,506; 3,637,543; 3,644,234: and 3,723,364. Generally speaking, such foams derive all their blowing action from the carbon dioxide generated by the reaction of the isocyanate with the carboxylic acid or anhydride derivative thereof and thus result in open-cell foams. While these foams have good high temperature and fire resistant properties, their thermal insulation values and friabilities in comparison with rigid halocarbon and particularly fluorocarbon blown polyurethane or polyurethane-polyisocyanurate foams leaves a lot to be desired. In another aspect, the carboxylic acids are employed in minor proportions to achieve other functions such as catalyst or blowing agents in polyurethane foam formation.

U.S. Pat. No. 2,842,506 teaches the use of organic carboxylic acid salts of tertiary amines as delayed action urethane catalysts. U.S. Pat. No. 3,681,272 teaches the preparation of both rigid and flexible polyurethane foams wherein the catalyst, described as a gel catalyst, is a mixture of $C_8$ to $C_{12}$ aliphatic carboxylic acid and a stannous compound. Water acts as the blowing agent with the catalyst mixture being employed in very minute quantities.

U.S. Pat. No. 4,473,666 in recognizing the negative environmental impact of fluorocarbon blowing agents in polyurethane foams, discloses the replacement of the fluorocarbon with formic acid. It should be noted that the formic acid is used in conjunction with water as the polyurethane blowing agent. The real inventive step in this patent is the selection of the urethane catalyst system of a combination of a dialkylcyclohexylamine and N-substituted alkoxyalkyl piperazine.

Certainly, co-blowing of polyurethane foams with mixtures of halocarbons and water has long been known and practiced. This technique has been particularly useful in the flexible foam field in providing foams of superior softness. This co-blowing lends itself to flexible foam manufacture because open cells are a requirement with these types of cellular polyurethanes. Aside from this well known co-blowing process for flexibles, U.S. Pat. No. 4,417,002 discloses soft flexible polyurethane foams wherein it is alleged that formic acid alone can be used in the blowing action. It should be noted that all of the working examples included water and that fluorocarbons can also be included. Rigid polyurethane foams are also disclosed wherein the combination of water and formic acid constitute the blowing reagents.

Total replacement of halocarbon and particularly fluorocarbon blowing agents is certainly an ultimate goal in addressing any questions relating to their negative environmental impact. However, it has been concluded that even a partial reduction in their use would have a favorable result in this regard. It should be noted that fluorocarbon blown rigid polyurethane foams have much superior physical properties compared with foams blown with carboxylic acids or combinations of water and acids. This superiority is seen particularly in thermal insulation and friability properties. Consequently, the replacement, even in partial amounts, of the so-called freons with carboxylic acids has yet to reach any commercial significance. This is a direct result of the competing reactions between hydroxyl and carboxylic groups for isocyanate when preparing rigid polyurethane foams. Even when stoichiometric allowance is made for the acid by adding sufficient isocyanate to react with both groups, there always appears to be some imbalance resulting in either unreacted isocyanate or, more often, hydroxyl groups left in the foam. This contributes to the cause of the inferior physical properties.

Accordingly, it would be highly desirable to provide rigid polyisocyanate based closed cell foams wherein the halocarbon proportions have been reduced to environmentally helpful levels and with the foams having thermal insulation, friability, and other physical properties similar to all halocarbon blown counterparts.

SUMMARY OF THE INVENTION

The present invention is directed to rigid polyurethane-polyisocyanurate foams prepared by bringing together under foam forming conditions a mixture comprising (a) an organic polyisocyanate; (b) a polyol; (c) a blowing agent mixture comprising (i) a halocarbon blowing agent and (ii) an organic carboxylic acid wherein said carboxylic acid group is attached to a non-aromatic carbon atom and wherein the proportion of equivalents of said carboxylic acid to the total equivalents of tertiary amine present in the reaction mixture is at least about 1.2:1; and (d) a trimerization catalyst.

The term "rigid" in respect of the foam products means a cellular polyurethane-polyisocyanurate having a closed cell content of at least 85 percent and a density falling within a range of from about 0.5 to about 20 pounds per cubic foot (pcf), preferably about 1.5 to about 6 pcf and, most preferably, from about 1.7 to about 3.0 pcf.

The rigid cellular polyurethane-polyisocyanurates of this invention meet the need set forth above for rigid foams with reduced halocarbon levels, while at the same time maintaining good physical properties including thermal insulation and friability.

Surprisingly, the foams in accordance with the present invention prepared with halocarbon levels reduced by about 10 to about 75 percent over the prior art are possessed of physical properties closely related to those prior art foams.

Of particular note are their excellent thermal insulation properties as observed by K-factor values measured in accordance with ASTM Test Procedure C-518. Also noteworthy, are the low friabilities of the present foams as measured in accordance with ASTM Test Method D-421.

The rigid foams can be employed for all the purposes for which the currently produced cellular products are conventionally employed and are particularly suited for applications such as thermal insulating building panels, insulation for tanks, pipes, refrigerator and freezer cabinets and the like.

DETAILED DESCRIPTION OF THE INVENTION

The rigid polyurethane-polyisocyanurate foams in accordance with the present invention are readily prepared by bringing together the (a) polyisocyanate; (b) polyol: (c) blowing agent mixture, and (d) trimerization catalyst under foam forming conditions using any of the mixing methods well known in the art. For example, see Saunders and Frisch, Vols. I and II, Polyurethanes Chemistry and Technology, 1962, John Wiley and Sons, New York, N.Y.: more pertinently, see any of the following illustrative U.S. patents for the preparation of polyurethane-polyisocyanurate foams: U.S. Pat. Nos. 3,896,052; 3,899,443: 3,903,018; 3,919,128; 3,986,991; 3,989,651: 4,003,859; 4,011,180: 4,039,487: 4,101,465; 4,237,238; 4,289,858; 4,339,343 whose disclosures, relative to the preparation of such foams including the polyisocyanates, polyols, foam forming ingredients such as blowing agents, catalysts and other adjuvants, are incorporated herein by reference. Accordingly, the foams are readily prepared by bringing together the ingredients either by hand-mix methods for small preparations and, preferably, machine mixing techniques including high pressure impingement mixing to form buns, slabs, laminates, pour-in-place, spray-on-foams, froths, reaction injection molded bodies, and the like.

The novelty in the present invention resides in the blowing agent mixture (c) to be employed with the urethane-isocyanurate forming ingredients. In its broadest scope the mixture comprises (i) a halocarbon blowing agent and (ii) an organic carboxylic acid. The blowing agent includes any of the known aliphatic or cycloaliphatic halocarbon blowing agents having 1 to 4 carbon atoms which are partially or fully substituted by halogen atoms selected from fluorine, chlorine, bromine, and mixtures thereof. Preferably, it is a fluorocarbon having 1 to 2 carbon atoms substituted by at least one fluorine atom. Most preferably, the blowing agent is a chlorofluorocarbon. Illustrative but not limiting thereof are dichlorodifluoromethane, dichlorofluoromethane, trichlorofluoromethane, methylene chloride, 1,1-dichloro-1-fluoroethane, 1,1-dichloro-2,2,2-trifluoroethane, 1,1,1-dichlorofluoroethane, 1,2,2-trichloro-1,1-difluoroethane, 1,1-difluoroethane, $C_4$ and $C_8$ cyclic Freon C-318, and mixtures thereof.

Preferred members of this group are trichlorofluoromethane, 1,1-dichloro-2,2,2-trifluoroethane, and 1,1,1-dichlorofluoroethane.

In respect of the second component (ii) of the blowing mixture, this includes any organic carboxylic acid inclusive of polycarboxylic acids provided the carboxyl group(s) be attached to carbon atoms which do not form part of an aromatic ring. In the event the compound does contain more than one carboxylic group, it is not essential but preferred that the groups not be on adjacent carbon atoms. Hydroxyl containing carboxylic acids can also be employed. Typical of the acids are aliphatic mono or polycarboxylic acids having from 1 to 18 carbon atoms such as formic acid, acetic acid, propionic acid, butyric acid, isobutyric acid, valeric acid, isovoleric acid, caproic acid, ethyl butyric acid, caprylic acid, isoamylacetic acid, ethylhexanoic acid, capric acid, lauric acid, myristic acid, palmitic acid, stearic acid, phenylacetic acid, cyclopentyl acetic acid, glycolic acid, lactic acid, citric acid, malic acid, glyoxylic acid, acrylic acid, methacrylic acid, maleic acid, fumaric acid, adipic acid, pimelic acid, suberic acid, azelaic acid, subacic acid, brassylic acid, mixtures of any of the above and the like; alicyclic (cycloaliphatic) mono or polycarboxylic acids having from 6 to 10 carbon atoms such as cyclopentane carboxylic acid, cyclohexane carboxylic acid, 4-methylcyclohexane carboxylic acid, cycloheptane carboxylic acid, 1,4-cyclohexanedicarboxylic acid, and the like.

A preferred group of acids comprises the aliphatic carboxylic acids having from 1 to 10 carbon atoms set forth above, and, even more preferred, are the branched aliphatic acids having from 4 to 8 carbon atoms such as isobutyric acid, α-methylbutyric acid, β-methylbutyric acid, α,α-dimethylbutyric acid (ethyldimethylacetic acid), α,β-dimethylbutyric acid (isopropylmethylacetic acid), α-ethylbutyric acid (diethylacetic acid), 5-methylhexanoic acid (isoamylacetic acid), α-methylhexanoic acid, α-ethylhexanoic acid (butylethylacetic acid), and the like.

The proportions in which (i) and (ii) are employed are not critical except to the extent that sufficient fluorocarbon should be present to maintain in the resultant foams the excellent thermal insulation and friability properties more consistent with fluorocarbon blowing than with carboxylic acid blowing. Advantageously, the mixture (c) comprises from about 50 to about 90 percent by weight of fluorocarbon and from about 50 to about 10 percent of the carboxylic acid. Preferably, the fluorocarbon is from about 65 to about 80 percent with the acid being 35 to 20 percent by weight.

The carboxylic acid proportion, however, is critical with respect to the total equivalents of tertiary amine present in the reaction mixture in order to obtain the desired blowing action. The reaction mixture should comprise a proportion of equivalents of carboxylic acid to total equivalents of tertiary amine of at least about 1.2:1, preferably at least about 1.5:1, more preferably at least about 1.8:1 and most preferably at least about 2.5:1.

The proportions in which the blowing mixture (c) is employed relative to the total weight of the isocyanate (a), polyol (b), and (c) are such as to provide whatever is the desired foam densities. Accordingly, the proportions will be such as to provide a density falling within a range of from about 0.5 to about 20 pounds per cubic foot. Actual proportions will vary for any given foam formulation depending on factors like the ratios of fluorocarbon to acid, boiling point of the fluorocarbon, acid reactivity with the isocyanate, viscosity of the foam forming ingredients, foam exotherms involved, to name but a few. For all these reasons, it is not always possible, a priori, to predict the amount of (c) required, but, generally speaking, it will fall within a range of from about 5 to about 20 percent by weight of the total of (a), (b), and (c). Preferably, it will be within about 5 to 15 percent, most preferably, about 7 to 12 percent by weight.

In a more preferred embodiment of the present invention, the blowing mixture (c) also contains water (iii). The use of the water not only allows for the lowered fluorocarbon levels but additionally results in other unexpected benefits. Amongst such benefits are a substantially lower catalyst level requirement, a foam rise profile resembling more closely an all fluorocarbon rise profile by having a shorter initiation time for a second rise, lower foam friabilities, and lower K-factor insulation levels.

When water is employed it is advantageously used in such proportions that the total weight percent proportions of components (i), (ii), and (iii) fall respectively within the ranges of from about 25 to about 95, from about 2 to about 60, and from about 0.5 to about 15 percent. Preferably, these proportions are from about 50 to about 90, from about 5 to about 40, and from about 1 to about 10 percent by weight, respectively. More preferably, about 65 to 85, about 9 to 30, and about 2 to 6 percent, respectively. Addition of water does not alter the proportions in which the mixture (c) can be used in relation to the isocyanate and polyol. Accordingly, the blowing agent mixture is employed according to the teaching set forth above when only (i) and (ii) are present.

The polyisocyanate component used in accordance with the present invention can be any organic polyisocyanate known to be useful in the preparation of rigid polyurethane foams. Included are aliphatic, cycloaliphatic, aromatic, and aliphatic-cycloaliphatic polyisocyanates. A preferred class comprises aromatic polyisocyanates. Illustrative but non-limiting are hexamethylene diisocyanate, 1,4-cyclohexane diisocyanate, 4,4'-methylenebis(cyclohexyl isocyanate), isophorone diisocyanate, m-, and p-phenylene diisocyanate, methylenebis(phenyl isocyanate), polymethylene poly(phenyl isocyanates), 2,4-, 2,6-toluene diisocyanate and mixtures thereof, quasi prepolymers based on toluene diisocyanates, dianisidine diisocyanate, bitolylene diisocyanate, naphthalene-1,4-diisocyanate, mixtures thereof, and the like.

A preferred group of polyisocyanates comprise the polymethylene poly(phenyl isocyanates), particularly the mixtures containing from about 20 to about 85 percent by weight of methylenebis(phenyl isocyanate) with the remainder of the mixture comprising polymethylene poly(phenyl isocyanates) of functionality greater than 2; and mixtures of these polymethylene poly(phenyl isocyanates) with isocyanate terminated quasi prepolymers prepared from 2,4-, 2,6-toluenediisocyanates and mixtures thereof with less than 0.5 equivalency of at least one polyol component; an even more preferred TDI quasi prepolymer for use in combination with polymethylene poly(phenyl isocyanates) is one wherein the TDI reactant is a crude undistilled TDI containing a major proportion (70-90 percent) of pure toluene diisocyanate with the residue being phosgenation by-products of the toluene diamine. This crude TDI can be optionally, partially trimerized (about 10 to 25 percent by weight) prior to reaction with deficient polyol to form the quasi prepolymer; this is in accordance with the general procedure set forth in U.S. Pat. No. 3,652,424. The proportions of the two components are not critical but preferably the quasi prepolymer does not exceed about 60 percent by weight of the polyisocyanate mixture; preferably the mixture comprises 40 to 75 percent by weight of polymethylene poly(phenyl isocyanate) with the balance being the quasi prepolymer.

The polyol component includes any organic polyol known to be useful for the preparation of rigid polyisocyanate based foams. That is to say, any organic compound having at least 2 active hydrogen containing groups and a molecular weight from about 225 to about 12,000 or average values thereof and oftentimes referred to as a polymeric polyol.

It is to be understood that, if desired, mixtures of polymeric polyols can be employed. Advantageously, the polyol has a functionality from about 2 to about 8 or average value thereof and includes polyether polyols, polyester polyols, reinforced or polymer polyols, polycarbonate polyols, resole polyols, polybutadiene based polyols, and the like. It will be noted that the lower molecular weight limitation of 225 set forth above is unusually low for the more conventional polymeric polyols. However, this lower limit is meant to include a most preferred class of so-called crude polyester polyols which will be discussed in detail below.

In respect of the conventional polymeric polyols, generally speaking, their molecular weight will fall within the range of about 1,000 to about 12,000, preferably from about 1,500 to about 6,000 with a functionality from about 2 to about 6. Illustrative, but not limiting, of the classes of such polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009): polyols obtained by the Mannich condensation of a phenolic compound with formaldehyde, an alkanolamine, and ethylene oxide (in accordance with U.S. Pat. No. 3,297,597); vinyl reinforced polyether polyols or polymer polyols, e.g. by the polymerization of styrene or acrylonitrile in the presence of the polyether: polyacetals prepared from glycols such as diethylene glycol and formaldehyde; polycarbonates, for example those derived from butanediol with diarylcarbonates; polyester amides: the resole polyols (see Prep. Methods of Polymer Chem. by W. R. Sorenson et al., 1961, page 293, Interscience Publishers, New York, N.Y.): and the polybutadiene resins having primary hydroxyl groups (see Poly Bd. Liquid Resins, Product Bulletin BD-3, October, 1974, Arco Chemical Company, Div. of Atlantic Richfield, New York, N.Y.).

A preferred group of conventional polyols comprises the polyalkyleneoxy polyols particularly the propyleneoxy-polyethyleneoxy capped polyols obtained by the alkoxylation of water, ammonia, ethylene glycol, propylene glycol, trimethylolpropane, pentaerythritol, mannitol, sorbitol, aniline, ethanolamine, ethylene diamine, and the like: the polyester diols obtained from the reaction of dibasic carboxylic acids such as succinic, adipic, suberic, azelaic, phthalic, isophthalic, and the like with alkylene glycols and oxyalkylene glycols to form the corresponding polyalkylene, and polyoxyalkylene ester diols or copolymers thereof: and the vinyl-resin reinforced propyleneoxy-ethyleneoxy capped diols and triols, particularly those polymer polyols reinforced with acrylonitrile.

The most preferred crude polyester polyols for the present blends are obtained from crude reaction residues or scrap polyester resins by their transesterification with low molecular weight glycols. Generally speaking, they consist of mixtures of a number of low and higher molecular weight hydroxyl containing components. Thus, their average molecular weights or equivalent weights are low. Generally speaking, the molecular weight falls within a range of from about 225 to about 5,000 with a functionality from about 2 to about 6. Preferably, the average molecular weight falls within a range of about 250 to about 1,500 with average functionalities of about 2 to about 4 with predominantly primary hydroxyl groups. A most preferred class of crude polyester polyol has an average molecular weight from about 250 to about 1,000 and average functionality from about 2 to about 3.

Those polyester polyol mixtures obtained from crude reaction residues include a number of sources. One such source comprises the polyester polyols derived from phthalic anhydride bottoms as disclosed in U.S. Pat. No. 4,521,611 whose disclosure relative thereto is incorporated herein by reference. Another source is exemplified by the mixtures derived from the so-called DMT (dimethyl terephthalate) process residues by transesterification with low molecular weight aliphatic glycols. Typical DMT polyester polyols, for example, are disclosed in U.S. Pat. No. 3,647,759 which disclosure is incorporated herein by reference in its entirety and wherein the residue derived from DMT production via air oxidation of p-xylene is utilized. The oxidate residue contains a complex mixture of polycarbomethoxy substituted diphenyls, polyphenyls, and benzylesters of the toluate family. This residue is transesterified with an aliphatic diol such as ethylene glycol, propylene glycol, diethylene glycol, dipropylene glycol, and the like to produce a variety of low cost, predominately hydroxyl-functional polyester polyols with a wide variety of physical properties. Such DMT derived polyester polyols are produced under the name TERATE® 200 series resin polyols supplied by Cape Industries Inc.

Those polyester polyol mixtures obtained from scrap polyester resins are best exemplified by the mixtures obtained by digesting scrap polyethylene terephthalate (PET) with low molecular weight aliphatic glycols. Typical are the aromatic ester based polyols derived from digesting polyalkylene terephthalate with organic diols and triols having a molecular weight from 62 to 500 as disclosed in U.S. Pat. No. 4,048,104 which disclosure relative thereto is incorporated herein by reference; the aromatic polyester polyols obtained from the reaction of polyethylene terephthalate residue with alkylene oxides in the presence of a basic catalyst as disclosed in U.S. Pat. No. 4,439,549 incorporated herein by reference; the aromatic polyester polyols derived from recycled polyethylene terephthalate waste streams, alkylene glycols, and dibasic acid waste streams as disclosed in U.S. Pat. No. 4,439,550 and U.S. Pat. No. 4,444,918 which disclosures relative thereto are incorporated herein by reference; the aromatic polyester polycarbonate polyols derived from polyethylene terephthalate residues and alkylene carbonates as disclosed in U.S. Pat. No. 4,465,793 which disclosure relative thereto is incorporated herein by reference; the liquid terephthalic ester polyols derived from recycled or scrap polyethylene terephthalate and diethylene glycol and one or more oxyalkylene glycols as disclosed in U.S. Pat. No. 4,469,824 which disclosure relative thereto is incorporated herein by reference; the polyester polyols made by first reacting recycled polyethylene terephthalate scrap with an alkylene glycol followed by reaction with an alkylene oxide as disclosed in U.S. Pat. No. 4,485,196 which disclosure relative thereto is incorporated herein by reference; the copolyester polyols comprising the reaction products of an aromatic component selected from phthalic derivatives, polyethylene terephthalate, or dimethyl terephthalate with dibasic acid compounds, at least one primary hydroxyl glycol, and at least small amounts of a secondary hydroxyl glycol as taught in U.S. Pat. No. 4,559,370 which disclosure is incorporated herein by reference; and the like.

Additionally, a minor proportion of a diluent glycol having a molecular weight of from about 200 to about 600 can be employed in the polyol mixture. Illustratively, this can include polyethylene glycols, polypropylene glycols, and the like. If employed, this diluent is illustratively present in the proportions of from about 2 to about 20 percent, preferably from about 5 to 10 percent by weight of the major polyol constituent.

As the foams in accordance with the present invention must contain isocyanurate linkages along with urethane linkages, the isocyanate component must always be employed in excess. Needless to say, it should be employed in a stoichiometric excess over whatever total active hydrogen equivalents are present which includes the hydroxyl equivalents of the polyol, the carboxylic acid equivalents, and the equivalents of water if it is employed. The term "equivalents" when used in relation to the polyols, acids, or water refers to their equivalent weights which in turn is defined as their respective molecular weights divided by the number of isocyanate reactive groups. It should be noted in the case of formic acid that it is actually difunctional with respect to isocyanate so that its equivalent weight is half its molecular weight as is the case with water. Accordingly, the proportions of reactants are such that the ratio of isocyanate equivalents to total active hydrogen equivalents falls within a range of from about 1.5:1 to about 8:1, preferably from about 2.5:1 to about 6:1, and, more preferably from about 2.5:1 to about 5:1.

A trimerization catalyst component (d) is required to ensure the trimerization of the excess isocyanate groups to isocyanurate linkages. Any catalyst or combination of catalysts known to act in this way can be employed. Illustrative trimer catalysts include the following groups: (1) Tertiary amine compounds which include N,N-dialkylpiperazines such as N,N-dimethylpiperazine, N,N-diethylpiperazine and the like; trialkylamines such as trimethylamine, triethylamine, tributylamine and the like; 1,4-diazabicyclo-[2.2.2]octane, which is more frequently referred to as triethylene diamine, and the lower-alkyl derivatives thereof such as 2-methyltriethylenediamine, 2,3 -dimethyltriethylene diamine, 2,5-diethyltriethylene diamine and 2,6-diisopropyltriethylene diamine; N,N',N"-tris(dialkylaminoalkyl)hexahydrotriazines such as N,N',N"-tris(dimethylaminomethyl)hexahydrotriazine, N,N',N"-tris(dimethylaminoethyl)hexahydrotriazine, N,N',N"-tris(dimethylaminopropyl)hexahydrotriazine; mono-, di-, and tri(dialkylaminoalkyl)monohydric phenols or thiophenols such as 2-(dimethylaminomethyl)phenol, 2,4-bis(dimethylaminomethyl)phenol, 2,4,6 -tris (dimethylaminomethyl)phenol, and the like; N,N,N',N'-tetraalkylalkylenediamines such as N,N,N',N'-tetramethyl-1,3-propanediamine, N,N,N',N'-tetramethyl-1,3-butanediamine, N,N,N',N'-tetramethylethylenediamine N,N,N',N'-tetraethylethylenediamine and the like; N,N-dialkylcyclohexylamines such as N,N-dimethylcyclohexylamine, N,N-diethylcyclohexylamine, and the like; N-alkylmorpholines such as N-methylmorpholine; N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like. The preferred tertiary amine catalysts for use in the process of the invention are triethylene diamines, the N,N',N"- tris(dialkylaminoalkyl)hexahydrotriazines, the mono(-dialkylaminoalkyl)phenols, and the 2,4,6-tris(dialkylaminoalkyl) phenols. (2) Alkali metal salts of lower alkanoic acids such as the sodium, potassium, or lithium salts of formic acid, acetic acid, propionic acid, butyric acid, isobutyric acid, valeric acid, caproic acid, heptanoic acid, caprylic acid, 2-methylhexanoic acid, 2-ethylhexanoic acid, and the like. A preferred member of this group is potassium 2-ethylhexanoate. (3) Combinations of an alkali metal salt of an N-substituted amide with an alkali metal salt of an N-(2-hydroxyphenyl)methyl glycine; and optionally a tertiary amine trimerization catalyst in accordance with the teaching of U.S. Pat. No. 3,896,052. (4) Combinations of a tertiary amine trimerization catalyst with an alkali metal salt of an N-substituted amide and a dibutyl tin di(alkanoate) in accordance with the teaching of U.S. Pat. No. 3,899,443. (5) Combinations of monomeric epoxides with a tertiary amine trimerization catalyst containing a dimethylamino group and an alkali metal salt of an N-(2-hydroxyphenyl)methyl glycine in accordance with the teaching of U.S. Pat. No. 3,903,018. (6) Combinations of a tertiary amine trimerization catalyst and a quaternary ammonium salt of an alkanoic acid in accordance with the teaching of U.S. Pat. No. 3,954,684.

Minor proportions of diluents can be employed with any of the above catalysts. These diluents may be non-reactive but more often will include minor proportions of glycols such as ethylene glycol, diethylene glycol, propylene glycol, dipropylene glycol, and the like.

Generally speaking, the proportions of trimer catalyst will fall within a range of about 0.01 to about 15 parts per 100 parts of the polyol, preferably within a range of about 0.5 to 10 parts. If diluents are employed with the catalysts, their weights are not included in these proportional ranges.

The use of a separate catalyst for urethane formation is strictly optional. In this connection, a major number of the catalysts listed above act in the dual role of both urethane and trimer catalysts. Accordingly, their use as the (d) component accomplishes both functions. However, there are a number of organometallic catalysts which can be used separately with a few illustrative examples being stannous octoate, dibutyl tin dilaurate, tin mercaptide, and the like.

Other preferred ingredients employed under the foam forming conditions are dispersing agents, cell stabilizers, and surfactants. Surfactants, better known as silicone oils, and/or other organic surfactants are added to serve as cell stabilizers. Some representative materials are sold under the names of B8404, B8409, SF-1109, L-520, L-521, L-5420, L-5430, DC-193, and LK-443 which are, generally, polysiloxane polyoxyalkylene block co-polymers, such as those disclosed in U.S. Pat. Nos. 2,834,748; 2,917,480; and 2,846,458, for example. When employed, the surfactant represents from about 0.05 to about 5, and, preferably 0.1 to 2 weight percent of the total ingredient weight.

Other optional additives for the foams of the invention can include from zero to 20, preferably from about 2 to about 15 parts of a flame retardant such as tris(2-chloroethyl)phosphate, tris(2-chloropropyl) phosphate, tris(2,3-dibromopropyl)phosphate, tris(1,3-dichloropropyl)phosphate, diammonium phosphate, various halogenated aromatic compounds, antimony oxide, alumina trihydrate, polyvinyl chloride, and the like, and mixtures thereof. Other additives such as carbon black, colorants, and the like can be added. The addition of fillers such as barium sulfate may be used in such proportions that do not detract from the K-factor of the foams.

As noted above, the rigid polyurethane-polyisocyanurate foams of this invention can be prepared within a density range of from about 0.5 to about 20 pcf. However, it is within the density of from about 1.7 to about 3.0 pcf where they enjoy their most unexpected benefits in properties while at the same time having greatly reduced fluorocarbon blowing agent requirements. The present foams within the above density range can be prepared with only about a 7 percent increase in initial K-factor over control foams while fluorocarbon levels are reduced by upwards of 50 to 75 percent. At the same time the present foams in some cases have aged K-factor values over prolonged periods of time which are virtually identical to those foams blown completely with fluorocarbon.

Additionally, the present foams have friabilities as low as 6 percent as measured by the ASTM Test Method D-421 which is lower than control foams blown with only fluorocarbon.

The following examples describe the manner and process of making and using the invention and set forth the best mode contemplated by the inventors of carrying out the invention but are not to be construed as limiting.

EXAMPLE 1

The following experiment describes the preparation of seven rigid polyurethane-polyisocyanurate foams in accordance with the present invention and a control foam for comparison.

The foams are prepared by mixing together the ingredients in the proportions of parts by weight set forth in Table I. The general procedure involves first manually mixing the polyol or B side ingredients in a 1 gallon plastic tub. The polyisocyanate or A side mixture is added and the ingredients rapidly mixed for 10 seconds using a high speed drill press motor (1720 r.p.m.) equipped with a 4 inch diameter Conn agitator. This mixture is immediately poured into a 14"×14"×14" cardboard box where the resulting foam is allowed to rise freely and the rise profile measurements in seconds recorded as set forth in Table 1. Each foam is aged for two days at ambient temperature (about 20° C. to 25° C.) prior to cutting and being submitted for the physical test measurements set forth in Table I.

The friability and K-factor data for foams 1 through 7 show clearly the reduction of CFC-11 blowing agent of upwards of 50 percent over the control foam with little or no loss in friability and aged K-factors quite comparable with the control foam. This is in contrast to water blown foams which do drop off both in friability and K-factor over freon blown foams. Only gel times are measured in runs 1 to 4 and the control foam as this is a key time in the rise profile. The runs 1 to 4 show no great departure from the control value.

TABLE I

| Foams | Control | 1 | 2 | 3 | 4 | 5 | 6 | 7 |
|---|---|---|---|---|---|---|---|---|
| Ingredients (pts. by wt.) | | | | | | | | |
| Component A | | | | | | | | |

TABLE I-continued

| Foams | Control | 1 | 2 | 3 | 4 | 5 | 6 | 7 |
|---|---|---|---|---|---|---|---|---|
| Polyisocyanate I[1] | 137 | 137 | 137 | 137 | 137 | — | — | 137 |
| Polyisocyanate II[2] | — | — | — | — | — | 137 | 137 | — |
| L-5340[3] | 1 | 1 | 1.04 | 1.04 | 1.04 | 1 | 1 | 1 |
| Component B | | | | | | | | |
| Terate 203[4] | 31 | 31 | 31.8 | 21.4 | 31.8 | 31 | 31 | 31.8 |
| E-400[5] | 3 | 3 | 3 | 2 | 2.1 | 3 | 3 | 3 |
| L-5420[6] | 0.7 | 0.7 | 0.7 | 0.5 | 0.5 | 0.7 | 0.7 | 0.7 |
| DER 331[7] | 4 | 4 | 4.0 | 2.8 | 2.8 | 4 | 4 | 4.2 |
| Trimer Catalyst I[8] | 3.61 | 6.5 | 5.7 | 7.6 | 8.63 | 4.5 | 3.7 | 5.3 |
| Diethylene glycol | 1.2 | 1.2 | — | 0.83 | 0.83 | — | — | — |
| N,N-dimethylcyclohexylamine | 0.08 | 0.16 | 0.9 | 1.72 | 3.1 | 0.33 | 0.12 | 1.0 |
| 2-ethylhexanoic acid | — | 6.2 | 9.0 | — | — | 3.0 | — | 9 |
| Azelaic acid | — | — | — | 6.21 | — | — | — | — |
| Glycolic acid | — | — | — | — | 4.76 | — | — | — |
| Formic Acid[9] | — | — | — | — | — | 1.8 | 2.76 | — |
| CFC-11 | 26.6 | 20.6 | 13.8 | 13.81 | 13.81 | 13 | 13 | 13.8 |
| % CFC-11 reduction | 0 | 22.5 | 48 | 48 | 48 | 5 | 51 | 48 |
| Index NCO/OH | 5.0 | 4.15 | 4.02 | 4.03 | 3.10 | 3.50 | 3.26 | 4.02 |
| Rise Profile[10] | | | | | | | | |
| $I_1/R_1$ | 30/99 | 25/80 | 15/80 | 20/59 | 18/60 | 20/70 | 20/110 | 17/82 |
| $I_2/R_2$ | 107/140 | 95/162 | 140/190 | 70/125 | 70/128 | 93/110 | — | 130/180 |
| G/F | 95/— | 89/180 | 85/— | 99/200 | 75/— | 92/220 | 75/205 | — |
| Physical Properties | | | | | | | | |
| Density (pcf) | 1.88 | 1.94 | 2.14 | 1.92 | 1.88 | 1.95 | 1.75 | 2.10 |
| Friability (%)[11] | 25.1 | 36.9 | 7.3 | 55.2 | 26.8 | 15 | 18 | 10.2 |
| K-Factor[12] | | | | | | | | |
| initial | 0.116 | 0.125 | 0.134 | 0.128 | 0.125 | 0.136 | 0.134 | 0.133 |
| aged (days) | 0.135 | 0.134 | 0.160 | 0.139 | 0.136 | 0.144 | 0.142 | 0.166 |
| | (21) | (21) | (43) | (46) | (18) | (14) | (14) | (50) |
| | 0.140 | 0.140 | | | | | | |
| | (46) | (46) | | | | | | |
| Compressive str. (psi) | | | | | | | | |
| (⊥) | 18 | 14 | 21 | 18 | 17 | 19.4 | 15.6 | 22.3 |
| (∥) | 39 | 34 | 45 | 28 | 35 | 42.1 | 36.8 | 45.6 |
| Humid Age[13] (% Δ Vol.) | | | | | | | | |
| 1 day | 3.7 | — | 2.7 | — | — | 1.9 | 2.0 | — |
| 7 days | 5.6 | — | 4.1 | — | — | 3.1 | 3.8 | — |
| 14 days | 5.6 | — | 4.4 | — | — | 3.4 | 4.4 | 3.8 |
| 28 days | 5.6 | 4.2 | 4.6 | 3.0 | 4.1 | 4.0 | 5.1 | 4.1 |
| Smith Test[14] | | | | | | | | |
| Heat Release | 98 | 177 | 92 | 90 | 79 | 62 | 59 | 59 |
| (BTU/ft²/3 mins) | 510 | 1334 | 320 | 631 | 861 | 728 | 595 | 470 |
| Smoke Release | 23 | 27 | 21 | 19 | 26 | 21 | 23 | 22.8 |
| (particles/ft²/3 mins) | | | | | | | | |
| Weight Loss (%) | | | | | | | | |

Footnotes to Table I

[1] Polyisocyanate I: A polymethylene poly(phenyl isocyanate) mixture comprising about 30 percent by weight of methylenebis(phenyl isocyanate) with the balance being polymethylene poly(phenyl isocyanates) of functionality higher than 2; I.E. = about 134; viscosity (25° C.) = about 900 cps.
[2] Polyisocyanate II: Similar to Polyisocyanate I but wherein the MDI content is about 29 percent; I.E. = about 138.2; viscosity (25° C.) = about 700 cps.
[3] L-5340: A polydimethylsiloxane polyoxyalkylene block copolymer surfactant supplied by Union Carbide Corportion.
[4] Terate 203: Transesterified crude DMT residue supplied by Cape Industries Inc., Wilmington, Delaware; OH E.W. = 178; functionality = about 2.3; viscosity = about 30,000 cps (25° C.).
[5] E-400: A 400 molecular weight polyethylene glycol.
[6] L-5420: A silicone surfactant similar to L-5340 above.
[7] DER 331: A liquid bisphenol A epoxy resin; epoxide eq. wt. = about 186 to 192; viscosity = from about 11,000 to about 14,000.
[8] Trimer Catalyst I: A 50% w/w solution of sodium N-(2-hydroxy-5-nonylphenyl)methyl-N-methylglycinate in diethylene glycol.
[9] Formic Acid: Contains about 3% by weight of water.
[10] Rise Profile: The time recorded in seconds from the start of mixing the foam ingredients (inclusive of the 10 second mixing period) until first initiation ($I_1$); first rise ($R_1$); second initiation ($I_2$); second rise ($R_2$); gel (G) and firm (F).
[11] Friability: % wt. loss of foam samples measured in accordance with ASTM Test Method D-421.
[12] K-Factor: Measure of heat transfer in BTU-inch/hour ft² °F. measured in accordance with ASTM Test Method C-518 at the initial time of measuring foam physical properties after curing for 2 days and thereafter measured according to the schedule of days noted in the Table I.
[13] Humid Age: The change in volume (Δ Vol.) of a sample of foam stored at 158° F. under 100% relative humidity for the number of days set forth in Table I.
[14] Smith Test: Test refers to measurement of a burning sample of foam measuring 9¼" square by 2" thick in a test chamber of the cumulated heat and smoke release over a 3 minute period and the percent weight loss from combustion carried out in accordance with the method and apparatus described by E. E. Smith, Journal of Fire Technology (3) p. 157, 1973.

EXAMPLE 2

This experiment describes the preparation of two rigid polyurethane-polyisocyanurate foams 8 and 9 in accordance with the present invention and a control foam for comparison. The same procedure and apparatus set forth in Example 1 is used herein along with the various ingredients int he proportions of parts by weight set forth in Table II. The foams 8 and 9 differ from those of Example 1 primarily in the lower NCO index of 2.5. Similarly to Example 1 this series shows that the fluorocarbon concentration can be reduced considerably without resulting in any drastic increase in friability or K-factor values.

TABLE II

| Foams | Control | 8 | 9 |
|---|---|---|---|
| Ingredients (pts. by wt.) | | | |
| Component A | | | |
| Polyisocyanate II | 146 | 146 | 146 |

TABLE II-continued

| Foams | Control | 8 | 9 |
|---|---|---|---|
| Component B | | | |
| Chardol-336A[1] | 100 | 100 | 100 |
| DC-193[2] | 2 | 2 | 2 |
| Trimer Catalyst II[3] | 1.5 | 5.0 | 7.0 |
| N,N-dimethylcyclohexylamine | 0.4 | 1.8 | 3.5 |
| Azelaic acid | 0 | 5 | 10 |
| CFC-11 | 44 | 30 | 25 |
| % CFC-11 reduction | 0 | 31 | 43 |
| Index NCO/OH | 2.5 | 2.5 | 2.5 |
| Rise Profile | 43 | 49 | 51 |
| Gel (sec.) | | | |
| Physical Properties | | | |
| Density (pcf) | 1.71 | 1.86 | 1.87 |
| Friability (%) | 11.9 | 17.9 | 6.4 |
| K-Factor | | | |
| initial | 0.124 | 0.125 | 0.132 |
| aged (days) | 0.151 | 0.147 | 0.175 |
| | (36) | (36) | (36) |

Footnotes to Table
[1]Chardol-336A: A polyester polyol digestion product of polyethylene terephthalate and glycols supplied by Freeman Chemical Inc; OH E.W. = about 239; functionality = about 2.1.
[2]DC-193: Silicone surfactant; see "Dow-Corning 193 Surfactant" bulletin supplied by Dow-Corning Corporation.
[3]Trimer Catalyst II: Hexchem 977 a solution of about 75 percent by weight of potassium octoate and 25 percent diethylene glycol; supplied by Mooney Chemicals Inc.

EXAMPLE 3

This experiment describes four rigid polyurethane-polyisocyanurate foams 10 to 12, inclusive, and a control foam. The control foam employs only water as a co-blowing agent with Freon-11 to reduce the required level of the latter, whereas the runs 10 to 12 employ the preferred combination of water and aliphatic acid in reducing the fluorocarbon level by almost 50 percent. The same procedure and apparatus set forth in Example 1 is used herein along with the ingredients in the weight proportions set forth in Table III.

The employment of the water with the acid results in substantially lower catalyst requirements than with the acid alone; for example compare foam 10 with a typical formulation such as foam 7 (Table I above) also in accordance with this invention. Additionally, the presence of the small proportion of water with the acid results in foams with the lowest K-factors and friabilities (e.g. foam 10). Significantly, the water also provides for a foam rise profile which can be adjusted to resemble that of a foam having all CFC-11 as blowing agent, i.e. the second initiation ($I_2$) of foams 10 and 11 are 90 and 95 seconds, respectively, which are faster than the typical value of 130 seconds for foam 7 and closer to the rise profile for the control foam in Table I which is the prior art with all freon blowing.

Accordingly, foams 10 through 12 provide for substantial fluorocarbon reduction, while at the same time providing for good K-factor, low friability, and overall good physical properties.

TABLE III

| Foams | Control | 10 | 11 | 12 |
|---|---|---|---|---|
| Ingredients (pts. by wt.) | | | | |
| Component A | | | | |
| Polyisocyanate I | 137 | 137 | 137 | 137 |
| L-5340 | 1 | 1 | 1 | 1 |
| Component B | | | | |
| Terate 203 | 31.8 | 31.8 | 31.8 | 31.8 |
| E-400 | 3 | 3 | 3 | 3 |
| L-5420 | 0.7 | 0.7 | 0.7 | 0.7 |
| DER 331 | 4.4 | 4.0 | 4.0 | 4.0 |
| Trimer Catalyst I | 4.0 | 4.8 | 5.3 | 5.5 |
| N,N-dimethylcyclohexylamine | 0.08 | 0.5 | 0.71 | 0.9 |
| Water | 1.1 | 0.7 | 0.45 | 0.18 |
| 2-ethylhexanoic acid | 0 | 3.0 | 6.0 | 8.0 |
| CFC-11 | 13.8 | 13.8 | 13.8 | 13.8 |
| % CFC-11 reduction | 45.9 | 46.8 | 47.8 | 48.3 |
| Index NCO/OH | 3.18 | 3.37 | 3.37 | 3.37 |
| Rise Profile (secs.) | | | | |
| $I_1/R_1$ | 35/120 | 20/75 | 15/80 | 15/90 |
| $I_2/R_2$ | — | 90/130 | 95/140 | 100/140 |
| G/F | 98/280 | 82/240 | 85/260 | 90/270 |
| Physical Properties | | | | |
| Density (pcf) | 2.09 | 1.99 | 1.92 | 1.99 |
| Friability (%) | 10.8 | 6.4 | 5.7 | 8.5 |
| K-Factor | | | | |
| initial | 0.127 | 0.124 | 0.129 | 0.132 |
| aged (days) | 0.134 (6) | 0.133 (8) | 0.136 (8) | 0.141 (8) |
| | 0.137 (21) | 0.147 (65) | 0.156 (65) | 0.168 (65) |
| Compressive str. (psi) | | | | |
| (⊥) | 19.9 | 18.7 | 17.6 | 16.8 |
| (∥) | 50.4 | 54.8 | 48.5 | 41.7 |
| Humid Age (% Δ Vol.) | | | | |
| 14 days | 5.0 | 4.0 | 3.9 | 4.1 |
| 28 days | 5.1 | 5.7 | 4.3 | 4.5 |
| Smith Test | | | | |
| Heat Release (BTU/ft$^2$/3 mins) | 144 | 118 | 108 | 132 |
| Smoke Release (particles/ft$^2$/3 mins) | 360 | 530 | 560 | 420 |
| Weight Loss (%) | 22.4 | 18.5 | 20.4 | 21.5 |

EXAMPLE 4

This experiment describes the preparation of five rigid polyurethane-polyisocyanurate foams (13 to 17 inclusive) in accordance with this invention. The same procedure and apparatus set forth in Example 1 is used herein along with the various ingredients in the proportions of parts by weight set forth in Table IV. The data set forth in Table IV shows the various proportions in which water and 97 percent by weight formic acid are used in co-blowing the foam along with the constant proportion of monofluorotrichloromethane. The key properties of friability and K-factor, along with foam rising conditions of initiation and gel times show that all of the foams have excellent properties in spite of the low fluorocarbon blowing.

The properties of these foams are superior to those wherein only formic acid and fluorocarbon are employed (see Foam 6, Table I above).

TABLE IV

| Foams | 13 | 14 | 15 | 16 | 17 |
|---|---|---|---|---|---|
| Ingredients (pts. by wt.) | | | | | |
| Component A | | | | | |
| Polyisocyanate II | 137 | 137 | 137 | 137 | 137 |
| L-5340 | 1 | 1 | 1 | 1 | 1 |
| Component B | | | | | |
| Terate 203 | 31 | 31 | 31 | 31 | 31 |
| E-400 | 3 | 3 | 3 | 3 | 3 |
| L-5420 | 0.7 | 0.7 | 0.7 | 0.7 | 0.7 |
| DER 331 | 4 | 4 | 4 | 4 | 4 |
| Trimer Catalyst I | 4.2 | 4.5 | 4.2 | 4.2 | 4.0 |
| N,N-dimethylcyclohexylamine | 0.15 | 0.2 | 0.2 | 0.19 | 0.12 |
| Water | 0.9 | 0.81 | 0.72 | 0.45 | 0.08 |
| Formic acid | 0.46 | 0.92 | 1.38 | 2.8 | 2.68 |
| CFC-11 | 13 | 13 | 13 | 13 | 13 |
| Index NCO/OH | 3.26 | 3.26 | 3.26 | 3.26 | 3.26 |
| Rise Profile (secs.) | | | | | |
| I/R | 22/99 | 28/110 | 26/110 | 22/100 | 20/110 |
| G/F | 92/220 | 85/240 | 88/240 | 82/280 | 75/205 |
| Physical Properties | | | | | |
| Density (pcf) | 2.10 | 2.00 | 1.90 | 1.56 | 1.75 |
| Friability (%) | 11.7 | 8.2 | 9.2 | 14.0 | 17.9 |
| K-Factor | | | | | |
| initial | 0.128 | 0.129 | 0.132 | 0.134 | 0.134 |
| 13 days | 0.136 | 0.136 | 0.140 | 0.144 | 0.142 |
| 62 days | 0.161 | 0.163 | 0.166 | 0.169 | — |

EXAMPLE 5

This experiment describes the preparation of five rigid polyurethane-polyisocyanurate foams (18 to 22 inclusive) in accordance with this invention. The same procedure and apparatus set forth in Example 1 is used herein along with the ingredients in the proportions of parts by weight set forth in Table V. The foams differ in the aliphatic carboxylic acid co-blowing agent employed. All of the foams are shown to have excellent physical properties. Foams 20 to 22 with their fast second initiation ($I_2$) along with their excellent K-factors show them to be preferred over the Foams 18 or 19.

TABLE V

| Foams | 18 | 19 | 20 | 21 | 22 |
|---|---|---|---|---|---|
| Ingredients (pts. by wt.) | | | | | |
| Component A | | | | | |
| Polyisocyanate II | 137 | 137 | 137 | 137 | 137 |
| L-5340 | 1 | 1 | 1 | 1 | 1 |
| Component B | | | | | |
| Terate 203 | 31 | 31 | 31 | 31 | 31 |
| E-400 | 3 | 3 | 3 | 3 | 3 |
| L-5420 | 0.7 | 0.7 | 0.7 | 0.7 | 0.7 |
| DER 331 | 4 | 4 | 4 | 4 | 4 |
| Trimer Catalyst I | 4 | 4 | 4.2 | 4.2 | 4.2 |
| N,N-dimethylcyclohexylamine | 0.16 | 0.15 | 0.28 | 0.28 | 0.28 |
| Diethylene glycol | 1 | 1 | 1 | 1 | 1 |
| Water | 0.7 | 0.8 | 0.8 | 0.8 | 0.8 |
| Formic acid | 1.3 | — | — | — | — |
| Acetic acid | — | 1.25 | — | — | — |
| Isobutyric acid | — | — | 1.83 | — | — |
| Ethylbutyric acid | — | — | — | 2.42 | — |
| Ethylhexanoic acid | — | — | — | — | 3.0 |
| CFC-11 | 13 | 13 | 13 | 13 | 13 |
| Index NCO/OH | 3.10 | 3.37 | 3.37 | 3.37 | 3.37 |
| Rise Profile (secs.) | | | | | |
| $I_1/R_1$ | 25/115 | 32/80 | 27/65 | 26/80 | 25/80 |
| $I_2/R_2$ | — | 86/120 | 70/85 | 86/115 | 85/115 |
| G/F | 95/220 | 91/250 | 70/150 | 85/200 | 83/200 |
| Physical Properties | | | | | |
| Density (pcf) | 1.93 | 1.99 | 1.94 | 1.97 | 2.02 |
| K-Factor | | | | | |
| initial | 0.131 | 0.127 | 0.125 | 01.27 | 0.128 |

TABLE V-continued

| Foams | 18 | 19 | 20 | 21 | 22 |
|---|---|---|---|---|---|
| 15 days Smith Test | 0.136 | 0.133 | 0.132 | 0.134 | 0.135 |
| Heat Release (BTU/ft$^2$/3 mins) | 45 | 52 | 96 | 45 | 39 |
| Smoke Release (particles/ft$^2$/3 mins) | 415 | 333 | 579 | 675 | 652 |
| Weight Loss (%) | 21 | 25 | 19 | 22 | 22 |

What is claimed is:

1. A closed cell rigid polyurethane-polyisocyanurate foam prepared by bringing together under foam forming conditions a mixture comprising (a) an organic polyisocyanate; (b) a polyol; (c) a blowing agent mixture comprising (i) a halocarbon blowing agent and (ii) an organic carboxylic acid wherein said carboxylic acid group is attached to a non-aromatic carbon atom and wherein the proportion of equivalents of said carboxylic acid to the total equivalents of tertiary amine present in the reaction mixture is at least about 1.2:1; and (d) a trimerization catalyst.

2. A rigid foam according to claim 1 wherein said (i) is a fluorocarbon.

3. A rigid foam according to claim 1 wherein said (ii) comprises an aliphatic carboxylic acid having from 1 to 10 carbon atoms.

4. A rigid foam according to claim 1 wherein the proportion of equivalents of said carboxylic acid to the total equivalents of tertiary amine is at least about 1.5:1.

5. A rigid foam according to claim 1 wherein the proportion of equivalents of said carboxylic acid to the total equivalents of tertiary amine is at least about 1.8:1.

6. A rigid foam according to claim 1 wherein the proportion of equivalents of said carboxylic acid to the total equivalents of tertiary amine is at least about 2.5:1.

7. A rigid foam according to claim 1 wherein said blowing agent mixture (c) comprises from about 50 to about 90 percent by weight of (i) and from about 50 to about 10 percent of (ii) based on the combined weights of (i) and (ii).

8. A rigid foam according to claim 1 wherein said blowing agent mixture (c) comprises from about 5 to about 20 percent by weight based on the total weight of said (a), (b), and (c).

9. A rigid foam according to claim 1 wherein said blowing agent mixture (c) additionally contains (iii) water in such proportions that the weight percent proportions of (i), (ii), and (iii) based on their combined weights are respectively from about 25 to about 95, from about 2 to about 60, and from about 0.5 to about 15 percent.

10. A rigid foam according to claim 1 wherein said (a) comprises an aromatic polyisocyanate.

11. A rigid foam according to claim 1 wherein said (b) comprises a polymeric polyol having a functionality of from about 2 to about 8 and molecular weight from about 225 to about 12,000 or average value thereof.

12. A rigid foam according to claim 8 wherein said polyol is a crude polyester polyol having a primary hydroxyl functionality of from about 2 to about 4 or average value thereof and a molecular weight from about 250 to about 1,500 or average value thereof.

13. A rigid foam according to claim 1 wherein the proportions of reactants are such that the ratio of isocyanate equivalents to total active hydrogen equivalents falls within a range of from about 1.5:1 to about 8:1.

14. A rigid foam according to claim 1 said foam prepared by bringing together:
 (a) a polymethylene poly(phenyl isocyanate);
 (b) a crude polyester polyol having a primary hydroxyl functionality of from about 2 to about 4 or average value thereof and molecular weight from about 250 to about 1,500 or average value thereof;
 (c) from about 5 to about 20 percent by weight based on the total weight of said (a), (b), and (c) of a blowing agent mixture comprising (i) from about 25 to about 95 percent by weight of a fluorocarbon, (ii) from about 2 to about 60 percent by weight of an aliphatic carboxylic acid having from 1 to 10 carbon atoms, and (iii) from about 0.5 to about 15 percent by weight of water;
 (d) a trimerization catalyst, wherein the proportions of reactants are such that the ratio of isocyanate equivalents to total active hydrogen equivalents falls within a range of from about 1.5:1 to about 8:1.

15. A rigid foam according to claim 11 wherein said aliphatic carboxylic acid is a branched C$_4$ to C$_8$ acid.

16. A rigid foam according to claim 12 wherein the proportions of said blowing agent mixture (c) comprises from about 7 to about 12 percent by weight of the total weight of (a), (b), and (c) and the blowing agent mixture itself comprises (i) from about 65 to about 85 percent by weight of monofluorotrichloromethane, (ii) from about 9 to about 30 percent by weight of the branched C$_4$ go C$_8$ aliphatic carboxylic acid, and (iii) from about 2 to about 6 percent by weight water.

17. A rigid foam according to claim 13 wherein said polyol component (b) additionally comprises a minor proportion of a diluent glycol having a molecular weight of from about 200 to about 600.

18. A rigid foam according to claim 14 wherein said (ii) comprises isobutyric acid.

19. A rigid foam according to claim 14 wherein said (ii) comprises ethylbutyric acid.

20. A rigid foam according to claim 14 wherein said (ii) comprises ethylhexanoic acid.

* * * * *